June 18, 1968 R. C. WILSON ET AL 3,388,911

HEAD SHIFT MECHANISM FOR TAPE RECORDER AND PLAYBACK MACHINES

Filed June 22, 1966 2 Sheets-Sheet 1

INVENTORS
REX C. WILSON
HANS W. MESSERSCHMIDT
ROBERT J. NICOLETTI
BY Zulwyder, Patton, Rieber, Lee and Utecht
ATTORNEYS

HEAD SHIFT MECHANISM FOR TAPE RECORDER AND PLAYBACK MACHINES

Filed June 22, 1966 2 Sheets-Sheet 2

INVENTORS
REX C. WILSON
HANS W. MESSERSCHMIDT
ROBERT J. NICOLETTI
By Fulwider, Patton, Rieber,
Lee, and Utecht
ATTORNEYS United States Patent Office 3,388,911
Patented June 18, 1968

3,388,911

HEAD SHIFT MECHANISM FOR TAPE RECORDER AND PLAYBACK MACHINES

Rex C. Wilson, Granada Hills, Hans W. Messerschmidt, Pacoima, and Robert J. Nicoletti, Burbank, Calif., assignors to Muntz Stereo-Pak, Inc., Van Nuys, Calif., a corporation of California Filed June 22, 1966, Ser. No. 559,506
11 Claims. (Cl. 274—4)

The present invention relates to improvements in tape recorder and playback machines and, more particularly, to an improved head shift mechanism enabling a tape machine to accurately record on or play back information from magnetic tapes having different numbers of recording tracks.

In order to maximize the amount of information which may be stored on a magnetic tape, it is general practice to record different information on different, closely spaced, parallel segments of the tape, commonly referred to as recording tracks.

To record on a multiple track recording tape, tape recorders for this purpose include a record head which is shiftable into accurate alignment with each track or pair of tracks on the tape (depending upon whether the recording is monaural or stereophonic). The same is true for machines for playing back information from a multiple track recording tape.

All magnetic tapes do not include the same number of recording tracks. For example, there are available today two and four-track monaural and four and eight-track stereophonic tapes. In magnetic tapes having different numbers of recording tracks, the recording tracks are spaced different distances apart. At the present time, the mechanisms for shifting the record and playback heads in tape recorder and playback machines are designed to shift the heads into alignment with a single preset number of recording tracks, for example, four or eight tracks. Therefore, different tape-handling machines are required to record on or play back information from magnetic tapes having different numbers of recording tracks. For example, there are four-track tape recorder and playback machines and there are eight-track tape recorder and playback machines. Neither type of machine is designed to record on or play back information from tapes having other than the preset number of tracks, either four or eight. Needless to say, this is an undesirable limitation.

Accordingly, it is an object of the present invention to provide a head shift mechanism for tape recorder and playback machines enabling the machines to handle tapes having different numbers of recording tracks.

Another object of the present invention is to provide a head shift mechanism of the foregoing character which is simple in design, inexpensive to manufacture, and easy to install and adjust.

The foregoing as well as other objects and advantages of the present invention may be more clearly understood by reference to the following detailed description when considered with the drawings which, by way of example only, illustrate one form of head shift mechanism embodying the features of the present invention.

Figures 1, 2:
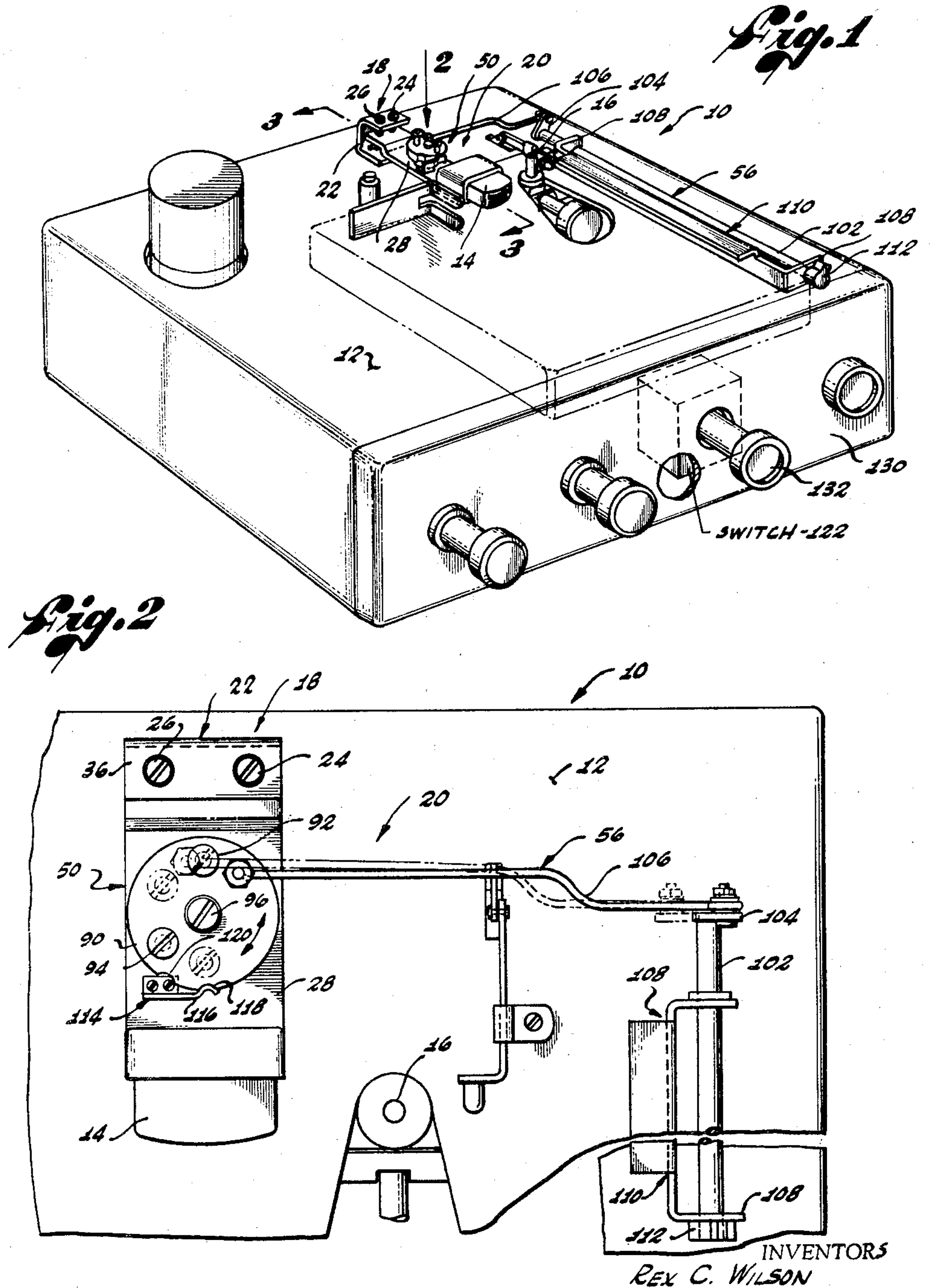
FIGURE 1 is a perspective view of a tape player including the head shift mechanism of the present invention.
FIGURE 2 is a plan view of the head shift mechanism looking in the direction of the arrow in FIGURE 1.

In the drawings, the tape player is represented generally by the numeral 10 and includes a flat horizontal top deck 12, a record or playback head 14, and a tape-driving capstan 16. A support device 18 supports the head 14 for vertical movement above the top deck 12 while a head shift mechanism 20 selectively controls the vertical position of the head.

Generally speaking, the head shift mechanism 20 provides the operator of the tape player 10 with means for selecting different sets of vertical positions for the head 14 in which the head will be in alignment with the recording tracks on tapes having different numbers of tracks, as well as means for selectively shifting the head between the different vertical positions. Thus, for example, the operator of the tape player may select a set of vertical positions for the head 14 in which the head will be in alignment with the recording tracks on a four-track tape and then may shift the head into alignment with each of the recording tracks to either record on or play back information therefrom. Alternatively, the operator may select a different set of vertical positions for the head 14 in which the head will be in alignment with the recording tracks on an eight-track tape and then may selectively shift the head into alignment with each of the recording tracks to either record thereon or play back information therefrom.

More particularly, the support device 18 comprises a generally C-shaped mounting bracket 22, a pair of vertical pin members 24 and 26, and a support plate 28 carrying the head 14 at a front end thereof.

The mounting bracket 22 comprises a lower leg 30 secured to the top deck 12 by screws 32, a vertical leg 34, and a forwardly-extending top leg 36.

The vertical pin members 24 and 26 extend downwardly through holes 38 in the top leg 36, aligned holes 40 in a rear portion 42 of the support plate 28, and screw into and through the lower leg 30 and the top deck 12. Upper portions 44 of the pin members 24 and 26 above the support plate 28 are of enlarged radial dimension and bear against the support plate around the holes 40 as the rear portion 42 of the support plate is forced upwardly by a looped spring member 46. The spring member 46 is stationed between the pin members 24 and 26 and the vertical leg 36 and continuously urges the rear of the support plate 28 upward to pivot the front portion of the support plate and the head 14 downward toward the top deck 12. The head shift mechanism 20 opposes the downward movement of the head 14 and selectively controls the vertical position of the head above the top deck in one of a plurality of sets of different vertical positions.

Figures 3, 4, 7:
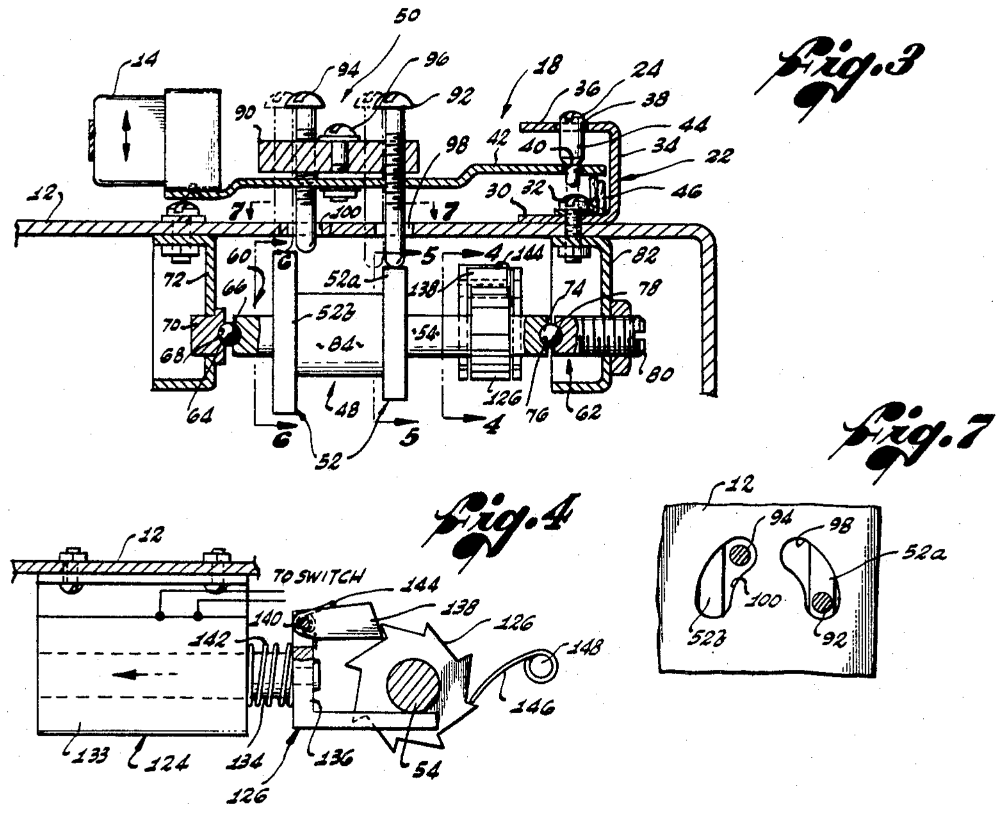
FIGURE 3 is a fragmentary cross sectional side view taken along the line 3—3 in FIGURE 1.
FIGURE 4 is a fragmentary front view taken along the line 4—4 in FIGURE 3.
FIGURE 7 is a fragmentary top view taken along the line 7—7 in FIGURE 3.

More particularly to impart vertical movement to the head 14 and to shift the head between vertical positions in different sets of vertical positions, the head shift mechanism 20 includes a cam device 48 and a cam follower unit 50 (see FIGURE 3). Generally speaking, the cam device 48 includes a plurality of cams 52 and a support shaft 54 for turning the cams. The cam follower unit 50 is connected to the support plate 28, adapted to selectively engage one of the cams 52, and in response to a turning of the shaft 54, is adapted to shift the head 14 between vertical positions in different sets of vertical positions defined by the cams. The head shift mechanism 20 also includes an actuator 56 (see FIGURES 1 and 2) for selectively shifting the cam follower unit 50 into and out of engagement with different ones of the cams 52 and an actuator 58 (see FIGURE 4) for selectively turning the shaft 54 between a plurality of rotational positions to raise and lower the head 14 between the vertical positions in each set of vertical positions.

In the illustrated form of the present invention and as most clearly represented in FIGURE 3, the support shaft 54 lies in a horizontal plane below the top deck 12 and in line with the support plate 28 and the head 14. The ends of the shaft 54 are supported by ball bearing units 60 and 62. The ball bearing unit 60 comprises a ball bearing 64 extending into and captured between opposing substantially hemispherical cavities 66 and 68 in one end of the shaft 54 and in a plug 70 carried by a hanger member 72 secured to the bottom of the top deck 12. The ball bearing unit 62 comprises a ball bearing 74 captured between opposing, substantially hemispherical cavities 76 and 78 in an opposite end of the shaft 54 and in the end of a horizontal screw member 80 extending through a hanger 82 connected to the bottom of the top deck 12. The ball bearing units 60 and 62 support the shaft 54 for turning about its longitudinal axis while the screw member 80 provides means for selectively adjusting the axial tension on the shaft to control end play of the shaft.

In the cam device 48, the cams 52 are carried by the support shaft 54, and in the illustrated form, includes two discs 52*a* and 52*b* coaxial with the support shaft and axially separated by a spacer 84. The support shaft 54 carries the discs 52*a* and 52*b* below the cam follower unit 50 such that when the cam follower unit is in contact with the periphery of one of the discs, a turning of the shaft raises and lowers the head 14 above the deck 12 between a plurality of different vertical positions in a set defined by cam surfaces on the periphery of the disc.

Figure 5:
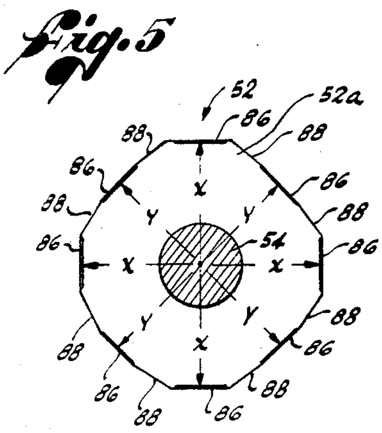
FIGURE 5 is a fragmentary front view taken along the line 5—5 in FIGURE 3.
Figure 6:
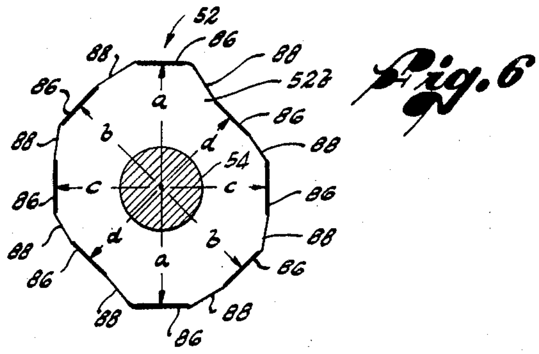
FIGURE 6 is a fragmentary front view taken along the line 6—6 in FIGURE 3.

In this regard, and as most clearly illustrated in FIGURES 5 and 6, the periphery of the discs 52*a* and 52*b* each include a series of equi-angularly spaced (45°), substantially flat, cam surfaces 86 separated by interconnecting surfaces 88 to define a ring of cams. Diametrically opposite cam surfaces 86 are spaced like distances from the center of the associated discs 52*a* and 52*b* while adjacent cam surfaces are spaced different distances from the center of the discs.

For example, as illustrated in FIGURE 5, the diametrically opposite cam surfaces 86 on the periphery of the disc 52*a* are of two different distances ($x$ and $y$) from the center of the disc. The disc 52*a* is therefore designed to raise and lower the cam follower 50 between two different vertical positions as the shaft 54 turns to bring the cam follower into engagement with consecutive cam surfaces 86 on the periphery of the disc. Accordingly, when the cam follower 50 is riding on the disc 52*a*, the head 14 may be selectively shifted between two different vertical positions in accurate alignment with two different pairs of recording tracks on a four-track stereophonic tape.

As illustrated most clearly in FIGURE 6, diametrically opposite cam surfaces on the periphery of the disc 52*b* are of four different distances ($a$, $b$, $c$ and $d$) from the center of the disc. The disc 52*b* is therefore designed to raise and lower the cam follower 50 between four different vertical positions as the shaft 54 turns to bring the cam follower into engagement with consecutive cam surfaces 86 on the periphery of the disc. Accordingly, when the cam follower 50 is riding on the disc 52*b*, the head 14 may be selectively shifted between four different vertical positions in accurate alignment with four different pairs of recording tracks on an eight-track stereophonic tape.

The illustrated form of the cam follower unit 50 for engaging one or the other of the cams 52 and for raising and lowering the head 14 between different vertical positions in different sets of vertical positions upon a turning of the support shaft 54 includes a horizontal disc 90 and two vertical screw members 92 and 94. The horizontal disc 90 is connected to the top of a central portion of the support plate 28 and as represented in FIGURES 2 and 3 is adapted to turn about a vertical axis defined by a screw 96 connecting the disc to the support plate. The two vertical screw members 92 and 94 extend downwardly through the disc 90 and through aligned arcuate openings 98 and 100 (see FIGURE 7) in the support plate 28 and in the top deck 12 of the tape player. The lower tip end of the screw member 92 is rounded and is adapted to engage and ride upon the periphery of the disc 52*a* while the lower tip end of the screw member is rounded and is adapted to engage and ride along the periphery of the disc 52*b* with a turning of the support shaft 54.

The cam follower unit 50 is designed such that the screw members 90 and 92 are selectively shiftable into and out of engagement with their associated discs 52*a* and 52*b* when it is desired to raise and lower the head 14 between different vertical positions in the different sets of vertical positions defined by the cam surfaces on the discs. Also, the cam follower unit 50 is designed such that only one of the screw members engages its associated disc at any given time. In the position illustrated in FIGURE 3, the tip of the screw member 92 engages and rides over the periphery of the disc 52*a*, while the tip of the screw member 94 is spaced from the disc 52*b*. By turning the disc 90, the screw member 94 swings into engagement with the disc 52*b* and the screw member 92 out of engagement with the disc 52*a*, as represented by the phantom outline in FIGURE 3. With the tip end of the screw member 94 engaging the periphery of the disc 52*b*, the head 14 is shifted between four different vertical positions upon a turning of the support shaft 54. With the tip end portion of the screw member 92 engaging the disc 52*a*, the head 14 is shifted between two different vertical positions with a turning of the support shaft 54.

Since accurate alignment is required between the head 14 and the recording tracks in each vertical position of the head, the discs 52*a* and 52*b* are carefully constructed. The vertical adjustability of the screw members 92 and 94, however, provides means for compensating for any variations in the dimensions of the discs 52*a* and 52*b* to insure proper alignment of the head 14 with each recording track on different multiple-track recording tapes.

As previously indicated, the actuator 56 is adapted to selectively shift the cam follower 50 into and out of engagement with the cams 52i n the cam device 48. In the illustrated form of the present invention and as represented most clearly in FIGURES 1 and 2, the actuator 56 comprises a rod 102, a crank arm 104, and a connecting arm 106. The rod 102 lies in a horizontal plane above the top deck 12 and is supported for turning about its longitudinal axis by flanged end portions 108 of a generally Z-shaped support member 110 connected to the top of the deck. The forward end of the rod 102 is connected to a knob 112 for hand turning the rod in clockwise and counterclockwise directions. The rear end of the rod 102 is connected to the vertical crank arm 104 which in turn is pivotally secured to the right end of the connecting arm 106. The left end of the connecting arm 106 is pivotally secured to the top of the disc 90 in the cam follower unit 50.

Thus arranged, a turning of the knob 112 produces a rotation of the disc 90 to bring one or the other of the screw members 92 or 94 into engagement with the periphery of the disc 52*a* or 52*b*. For example, a turning of the knob 112 in a counterclockwise direction brings the screw member 92 into engagement with the disc 52*a* while a turning of the knob in a clockwise direction brings the screw member 94 into contact with the disc 52*b*. When, as here, the discs 52*a* and 52*b* and screw members 92 and 94 are adapted to shift the head 14 between vertical positions in alignment with recording tracks on four and eight-track stereo tapes, the counterclockwise and clockwise rotational positions of the knob 112 may be designated as four and eight-track positions, respectively.

In order to prevent accidental shifting of the cam follower unit 50 from a position in engagement with one or other of the discs 52*a* or 52*b*, a catch 114 is included for releasably locking the disc 90 in one or the other of two rotational positions. As illustrated most clearly in FIGURE 2, the catch 114 includes a leaf spring 116 connected to the top of the support plate 28 with an end adapted to press against the periphery of the disc 90. The disc 90 includes two arcuate slots 118 and 120 in its peripheral surface into which the end of the leaf spring 116 extends to releasably lock the disc 90 in one or the other of two rotational positions with the screw members 92 and 94 in engagement with the discs 52*a* and 52*b*, respectively.

As previously described, the actuator 58 is designed to turn the support shaft 54 and cam discs 52*a* and 52*b* between a plurality of preselected positions and to thereby cause the head 14 to be raised and lowered between different pluralities of vertical positions depending upon which disc is engaged by the cam follower 50. To accomplish this, the actuator 58 comprises an electrical switch 122, a solenoid 124, a ratchet wheel 126, and a reciprocating drive 128.

The switch 122 is mounted within the tape player 10 adjacent a front panel 130 and may be momentarily closed by pressing inward on a push-button knob 132 extending through the front panel.

As illustrated in FIGURE 4, the solenoid 124 is secured to the bottom of the top deck 12 and is electrically connected to a switch 122 such that a closing of the switch completes an electrical circuit to a power supply for energizing the coil 133 of the solenoid. In addition to its coil, the solenoid 124 includes a movable armature 134 normal to the axis of the shaft 54 and carrying the reciprocating drive 128 for selectively turning the ratchet wheel 126, which is secured to the support shaft.

The reciprocating drive 128 includes a vertically-extending support arm 136 fixedly connected to the right end of the armature 134 outside of the coil 133, and an actuating arm 138 pivotally connected to a top portion of the support arm by a horizontal pin 140. The support arm 136 and the armature 134 are continuously urged toward the support shaft 54 and ratchet wheel 126 by a coil spring 142. The coil spring extends around the armature and bears against the right side of the coil 133 and the left side of the support arm 136. A bent spring 144 extending around the pin 140 and engaging an upper side of the actuating arm 138 and a right side of the support arm 136 continuously urges a tip of the actuating arm 138 remote from the support arm 136 downward to engage a tooth on the periphery of the ratchet wheel 126. Thus arranged, the reciprocating drive 128 is adapted to turn the ratchet wheel 126 and support shaft 54 in a clockwise direction while a pawl 146 is adapted to prevent counterclockwise turning of the shaft.

More particularly, the pawl 146 is connected to a horizontal pin 148 and is adapted to engage teeth of the ratchet wheel on a side opposite the actuating arm 138 to prevent counterclockwise rotation of the ratchet wheel 126.

However, the pawl 146 permits clockwise turning of the ratchet wheel 126 and support shaft 54 upon operation of the solenoid 124 and reciprocating drive 128. In that regard, a closing of the switch 122 energizes the solenoid to retract the armature 134 into the coil. As this occurs, the support arm 136 moves to the left and the actuating arm 138 swings downward on the periphery of the ratchet wheel 126 to engage the next tooth on the wheel. When the switch opens, the solenoid is deenergized and the coil spring 142 rapidly moves the armature and reciprocating drive to the right to turn the ratchet wheel 126 and support shaft 54 a rotational distance corresponding to one tooth on the ratchet wheel.

The teeth of the ratchet wheel 126 are equally spaced from each other (at 45° intervals) and are equal in number to the number of cam surfaces 86 on each of the cam discs 52. The ratchet wheel is mounted on the support shaft 54 relative to the cams 52 such that when the solenoid is deenergized, a cam surface 86 on each disc 52*a* and 52*b* is below the cam follower unit 50 and one of the screw members 92 or 94 is in contact with one of the thus positioned cam surfaces. Therefore, selective operation of the actuator 58 is designed to selectively step the support shaft 54 through a plurality of preselected rotational positions to raise and lower the head 14 between a plurality of vertical positions in alignment with the recording tracks on the tape being handled by the tape player 10.

From the foregoing, it is appreciated that the present invention provides a head shift mechanism which is simple in design and which enables a tape player to handle tapes having different numbers of recording tracks.

While a particular form of head shift mechanism has been described in some detail herein, changes and modifications may be made in the illustrated form without departing from the spirit of the invention. It is therefore intended that the present invention be limited in scope only by the terms of the following claims.

We claim.

1. A head shift mechanism in a tape recorder or playback machine for handling magnetic tapes having different numbers of recording tracks, comprising:

a record or playback head;

means supporting said head for vertical movement above a top deck of said machine;

cam means including at least two sets of cams and a support shaft for carrying said sets of cams;

cam follower means connected to said head for engaging one or the other of said sets of cams to raise and lower said head between two pluralities of different vertical positions with a turning of said shaft;

selectively operable means for shifting said cam follower means relative to said cam means to engage one or the other of said sets of cams;

and selectively operable means for turning said shaft between a plurality of preselected positions.

2. The mechanism of claim 1 including means supporting said shaft against axial movement.

3. The mechanism of claim 2 wherein said sets of cams are separate rings of cams and said shaft is coaxial with said rings of cams.

4. The mechanism of claim 3 wherein said cam follower means includes two vertically adjustable screw members, one for each ring of cams, and means for shifting said screw members into and out of engagement with associated ones of said rings of cams.

5. The mechanism of claim 4 including means for releasably locking said screw members in contact with said associated ones of said rings of cams.

6. The mechanism of claim 3 wherein said means supporting said shaft supports said shaft in a substantially horizontal plane, the periphery of said sets of cams defines said rings of cams, and said rings of cams are axially separated along said shaft below said cam follower means.

7. The mechnism of claim 6 in cluding ball bearing means at opposite ends of said shaft supporting said shaft for turning about a horizontal axis.

8. The mechanism of claim 7 including means for adjusting axial forces on said ball bearings against said ends of said shaft.

9. The mechanism of claim 6 wherein said cam follower means includes two vertically adjustable screw members, one for each ring of cams, and means for shifting said screw members into and out of engagement with associated ones of said rings of cams.

10. The mechanism of claim 9 wherein said means for shifting said screw members comprises a horizontal disc connected to said head for turning about a vertical axis and carrying said screw members, and selectively operable means for turning said disc to bring one or the other of said screw members into engagement with its associated ring of cams.

11. The mechanism of claim 10 including means for releasably locking said disc in different rotational positions with said screw members in contact with their associated rings of cams.

References Cited

UNITED STATES PATENTS

| | | | |
|---|---|---|---|
| 3,278,694 | 10/1966 | Pastor et al. | 179—100.2 |
| 3,190,970 | 6/1965 | Atsumi | 179—100.2 |

LEONARD FORMAN, *Primary Examiner.*
ROGER A. FIELDS, *Examiner.*